United States Patent [19] [11] 4,119,954
Seitz et al. [45] Oct. 10, 1978

[54] HIGH RESOLUTION CHARACTER GENERATOR FOR DIGITAL DISPLAY UNITS

[75] Inventors: Charles Lewis Seitz, Fallbrook; Paul Grunewald, San Diego, both of Calif.

[73] Assignee: Burroughs Corporation, Detroit, Mich.

[21] Appl. No.: 777,689

[22] Filed: Mar. 15, 1977

[51] Int. Cl.[2] .................... G06F 3/14
[52] U.S. Cl. .................... 340/324 AD; 178/30
[58] Field of Search .................... 340/324 AD, 324 A; 178/15, 30

[56] References Cited

U.S. PATENT DOCUMENTS

| | | | |
|---|---|---|---|
| 3,643,251 | 2/1972 | Kolb et al. | 340/324 AD |
| 3,680,076 | 7/1972 | Duffek et al. | 340/324 AD |
| 3,878,536 | 4/1975 | Gilliam | 340/324 AD |

*Primary Examiner*—Marshall M. Curtis
*Attorney, Agent, or Firm*—Mervyn L. Young; Kevin R. Peterson

[57] ABSTRACT

The disclosure relates to a digital display system including a display monitor and character generation circuitry to create characters on the display screen in the form of a dot matrix during the scanning of the display screen. The display screen is actually scanned twice with each field of scan being controlled by the same sets of signals from the character generator. Logic circuitry is provided between the character generator and the display screen to fill in information bit areas adjacent to character dot areas which form a diagonal so as to thereby give the displayed character a smooth appearance.

8 Claims, 11 Drawing Figures

HIGH RESOLUTION CHARACTER GENERATOR FOR DIGITAL DISPLAY UNITS

BACKGROUND OF THE INVENTION

1. Field of the Invention

This invention releates to digital display units and more particularly, to high resolution generators for such display units and the method employed thereby.

2. Description of the Prior Art

New applications are being increasingly found for display units coupled to a data processing system. Such display units may be custom made for such purposes or may be formed of conventional commercial television sets. In either case, the information displayed is usually of the nature of characters formed of a dot matrix where the display unit employs a raster scan mode. Each horizontal line is divided into a number of discrete points or areas called picture elements (PELS). A fraction for such picture elements per line are not employed for information display but are that portion of the scan time required for a horizontal retrace and synchronization of the horizontal oscillator.

As the display screen is scanned, the dotmatrix characters are formed by character generation circuits that control the modulation of the electron beam (in the case of CRT displays), individual circuits of which are selected by character codes that are stored in a memory. This code store can be a shift register with exactly the same number of cells as there are character positions on the display screen or it may be a random access memory. In the case of a recirculating shift register, the character codes are shifted in synchronization with the raster scan thus bringing the initial character, to be displayed, back to its proper position after each complete scan.

In some display units, 30 complete scans of all of the lines making up the display are made per second. Thus, each portion of a character being displayed is on display 30 times a second for a brief period and this can cause an apparent flickering. The flickering problem is normally solved by refreshing or redrawing all of the lines in the display in two consecutive interlaced scans. A "half scan" is redrawn or refreshed in one-sixtieth of a second. Because of the 2:1 interlace between the two half scans, if a horizontal line is drawn in one half scan and is adjacent to a line drawn in the next half scan the two form a line on the display screen which does not flicker because, in essence, it is written 60 times a second. Applying this knowledge, a 6 × 8 dot matrix character can be displayed on a 12 × 16 dot matrix, by displaying each dot in the 6 × 8 matrix four times. This reduces the flicker considerably, as the character now seems to be written 60 times a second, instead of 30 times. However, this results in an objectionable feature in that diagonal lines have a ragged appearance since "included" corners are not provided. This ragged appearance becomes more pronounced if the characters are displayed with a finer resolution than that with which they are stored in the character generator store.

It is, then, an object of the present invention to provide an information display unit which is flicker free and in which the displayed characters do not have a ragged appearance.

It is another object of the present invention to provide a flicker free display unit for digital information which displays relatively smooth characters without regard to the resolution or size of the matrix making up the individual characters.

It is still another object of the present invention to provide high resolution character generation circuitry for a display unit that may employ a commerical television set.

SUMMARY OF THE INVENTION

To accomplish the above described objects, the present invention resides in a digital display system including a display monitor and character generation circuitry to create characters on the display screen in the form of a dot matrix during the scanning of the display screen. The display screen is actually scanned twice with each field of scan being controlled by same sets of signals from the character generator. Logic circuitry is provided between the character generator and the display screen to fill in information bit areas adjacent to character dot areas which form a diagonal so as thereby to round out the character being displayed. The invention is not limited to CRT displays and may be employed with any display using dot matrix characters such as matrix printers and the like.

A feature then of the present invention resides in a digital display system having a display screen and character generating circuitry to generate character information signals which control the display of characters on the display screen during interleaved scans and logic circuitry between the character generating circuitry and the display screen to generate extra information bits whenever information bits being displayed form a diagonal.

DESCRIPTION OF THE DRAWINGS

The above and other objects, advantages and features of the present invention will become more readily apparent from a review of the following specification when taken in conjunction with the drawings wherein.

GENERAL DESCRIPTION OF THE INVENTION

Figure 1:
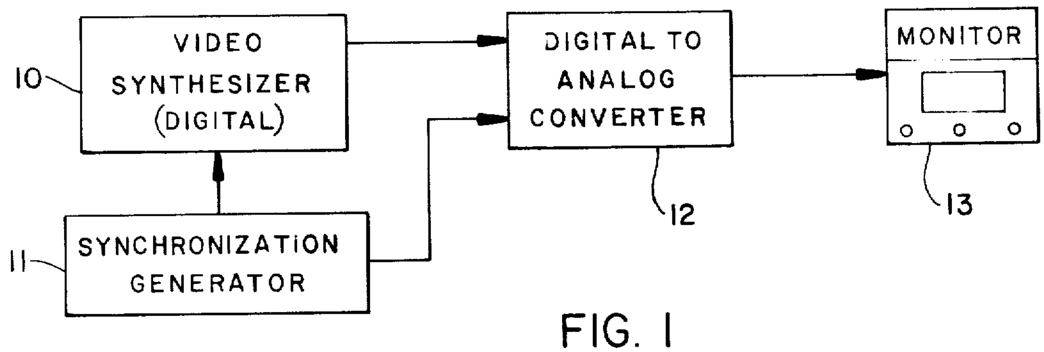
FIG. 1 is a diagram of a system employing the present invention.

A digital display system of the type employing the present invention is illustrated in FIG. 1. Such a system includes a digital video synthesizer 10 which along with a synchronization generator 11 supplies signals to digital-to-analog converter 12 to produce the video signal supplied to the display monitor 13. Synchronization generator 11 generates all of the timing signals required, which timing signals are the vertical and horizontal picture signals, field, bit clock and synchronization signal.

The synchronization signal supplies the information necessary to synchronize the internal oscillators in monitor 13 with the synchronization generator 11. The horizontal and vertical picture signals create picture geometry of the television screen which may be, for example, 480 lines by 640 picture elements. The field signal determines which of the two fields in the interlaced frame is to be displayed. The bit clock is the signal which divides a horizontal line into its 780 picture elements, it being remembered that not all of the picture elements are used for information display purposes.

Video synthesizer 10 contains all of the circuitry required to create an image on the display monitor 13 in the area determined by the vertical and horizontal picture signals. The synthesized video information is digital in the case of the present invention.

Digital-to-analog converter 12 combines the signals from video synthesizer 10 and synchronization generator 11 into an analog signal. This analog signal is a composite video signal containing the synchronization as well as the picture information. This signal can be sent to display monitor 13 which is adapted to receive the composite video signal, or it can be modulated so that it can be applied to any regular television receiver.

Figure 2:
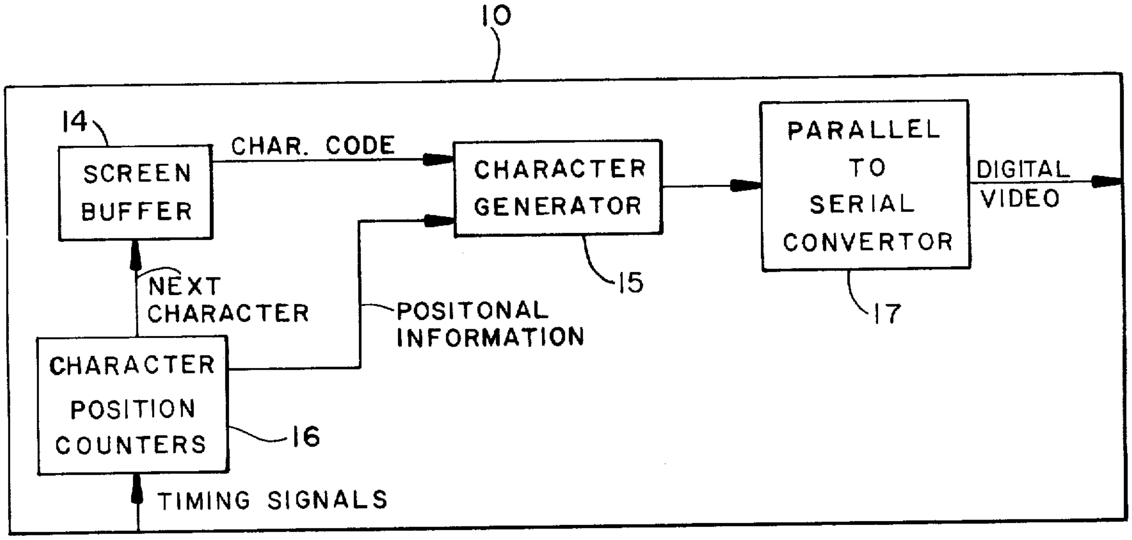
FIG. 2 is a diagram of a video synthesizer as employed in the system of FIG. 1.

The component parts of video synthesizer 13 are illustrated in FIG. 2 and include screen buffer 14, which along with character position counters 16 supply the information to character generator 15. The character signals are received from character generator 15 in parallel and are supplied to parallel-to-serial converter 17, the output of which is then a series of digital picture signals.

The picture on display monitor 13 is refreshed or redrawn a number of times per second, 30 times a second in the embodiment of the present invention. This is required when the display monitor 13 itself has no storage capability. For this reason, there has to be a storage for the information to be displayed during each scan of the display. Screen buffer 14 of FIG. 2 provides this capability. For a character display, this store contains the codes of the different characters to be displayed on the screen. It could be a shift register with exactly the same number of cells as there are character positions on the display screen. With a recirculating shift register, that register will bring all the character codes back to their proper position after each complete scan and the recirculation of the character code is synchronized with the scan.

Character position counter 16 creates a coordinate system on the display screen in which the characters are to be placed. As described above, the display area of the television screen can be divided into a coordinate system which, in the embodiment being described, has 640 picture elements on a horizontal line and 480 lines in the picture. If a chosen character set were to contain, for example, characters 10 picture elements wide and 16 lines high, the character position counter would divide the screen into 64 character positions horizontally and 30 character lines vertically for a $64 \times 30 = 1,920$ characters to be displayed.

Figure 4A:
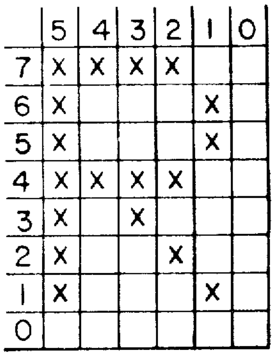
FIGS. 4A–C represent a character as displayed both without and with the circuitry of the present invention.

Character generator 15 generates the signals for each character dot-matrix pattern. For a brief explanation of this pattern, reference is now made to FIG. 4A which illustrates the dot-matrix pattern for the letter "R". The dot matrix, in this example, is an area of eight rows of six picture elements each. The character "R" is defined by those areas marked with "*x*'s" which represent the picture elements on the display screen that will be activated during the character generation or appear as white dots on the display screen with the blank areas in FIG. 4A representing black dots or inactivated areas. The character created on the display screen is represented by the black and white areas according to the character pattern.

The informational picture that is to be displayed on the display screen is generated by the modulation of the electron beam that scans the screen left to right and from top to bottom. In the embodiment of the present invention, the horizontal scan is at a rate of 15.75 KHz and the top to bottom scan is at 60 Hz. To display characters in a dot matrix fashion on the display screen, it is necessary to know which character, and which of the rows of the character are to be displayed. The information about the character to be displayed comes from screen buffer 14 of FIG. 2, whereas the information about the rows comes from character position counter 16. This information is supplied to a read only memory (ROM) in character generator 15. In this ROM, patterns such as illustrated in FIG. 4A are stored. To obtain one row out, it is sufficient to give the character codes stating which character is to be displayed and a row number to this ROM. As an example, if one wanted to display an "R" and the row selected is to be row 4, the bits at the output of the ROM would be $(111100)_2$.

Parallel-to-serial converter 17 of FIG. 2 is a shift register with the function to accept the bits out of the character ROM of character generator 15 at the beginning of each character position and to shift the bits out one by one through the digital-to-analog converter to the display monitor at the bit clock rate.

Figure 4B:
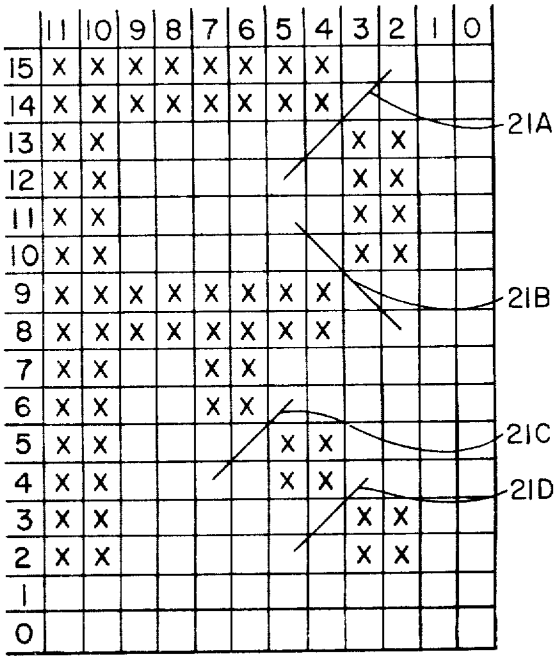

As was indicated above, it is common to employ an interlaced scan in a commercial television display to reduce the flickering of that information as it is seen by the viewer. To this end the individual character information generated by the character generator circuitry is displayed four times. Thus, a $6 \times 8$ character such as illustrated in FIG. 4A becomes a $12 \times 16$ character dot matrix as illustrated in FIG. 4B. The figure in 4B appears to be ragged because of the lack of informational bits as illustrated in FIG. 4B in the areas denoted by diagonal line 21A–D. Because of the display of each informational bit four times, there results the exclusion of "included" corners. The present invention is adapted to provide informational bits to adjacent areas whenever "included" corners are to occur. This results in the display of a character as illustrated in FIG. 4C.

DETAILED DESCRIPTION OF THE INVENTION

Figure 3:
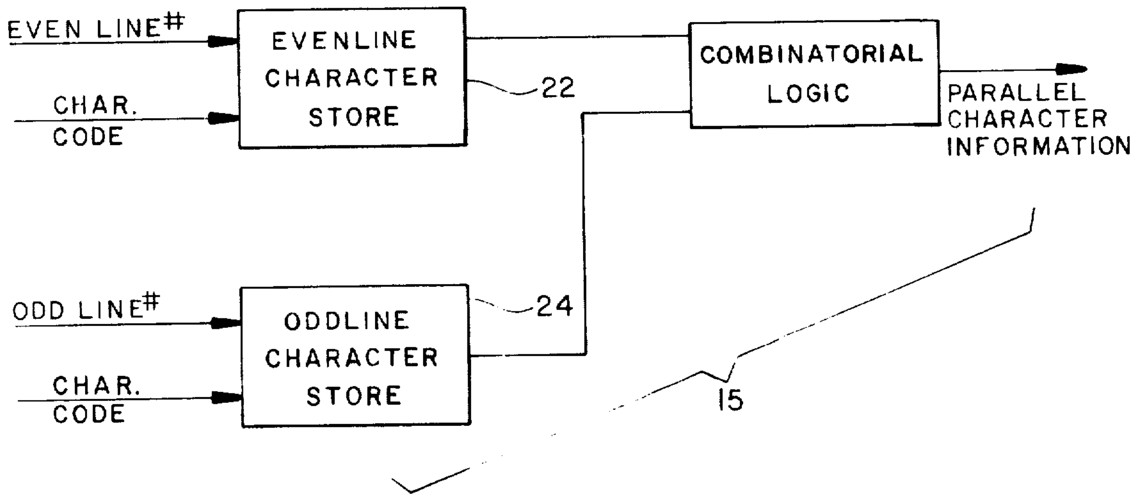
FIG. 3 is a diagram of the character generator system as employed in the synthesizer of FIG. 2.
Figure 4C:
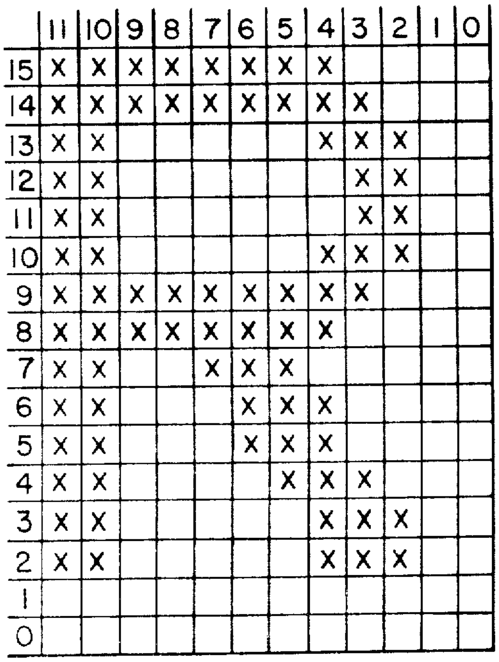

The present invention employs logic circuitry to detect the occurrance of "included" corners with the result that no more storage of informational bits is required to produce the result of FIG. 4C than is required to produce the result of FIGS. 4A or 4B. With the present invention, each character is processed "on the fly" as it comes out of the character ROM. The same amount of storage is required to produce the display as illustrated in FIG. 4B as is required to produce the display as illustrated in FIG. 4A. This storage may be divided into two character ROMs, each containing half of the information for characters such as depicted in FIG. 4A, one ROM for odd rows and the other ROM for even rows of the character being displayed. The relation of the two ROMs is illustrated in FIG. 3. Before describing logic circuitry employed by the present invention to produce a character such as illustrated in FIG. 4C, an explanation will be given about the generation of a character as illustrated in FIG. 4B. It is assumed that two character ROMs are employed, one of the ROMs containing information for even rows and the other containing information for odd rows.

To generate the required information signals for the nth row of FIG. 4B, that ROM is addressed which contains the row number which is an integer part of $n/2$, Row int($n/2$), of the original character. This might be the odd or even ROM, depending on whether int($n/2$) is odd or even. Each of the bits coming out of the ROM are to be displayed twice in order to generate a character like the one in FIG. 4B. The information, necessary to make that character without filled-in "included" corners, will be called the primary character information.

To obtain characters like the one in FIG. 4C, i.e., with the "included" corners filled in, the additional information required is called the secondary character information. For odd lines in the character, it is required to know what the previous line of the character consisted of, and for even lines, it is necessary to know what the next line of the characters will be. This knowledge is sufficient information to determine if "included" corners will occur. For example, if the $n$th row of the primary character information comes from Row int($n/2$), which may be in either of the even or odd ROM, then the additional information has to come from the other ROM since it is the Row int($n/2$)+1 (mod. 8) or Row int($n/2$)−1 (mod. 8), where 8 is the number of rows in the original character (8 × 6). Once the information about the two lines has been provided, then it is possible for logic circuitry to fill-in the "included" corners.

The algorithm of the steps employed by the logic circuitry in the present invention can be formulated in the following manner. Assume that the primary character information comes in a six bit parallel form out of ROM A as bits $a_5$ through $a_0$, and that the secondary character information comes from ROM B, also in a six bit parallel form as $b_5$ through $b_0$. These signals are to be combined by the logic circuitry to produce an output from the character generator in a 12 bit parallel form, $c_{11}$ through $c_0$ where $c_i$, for $i = 0,1 \ldots 11$, will be represented by the following equations:

$$C_{2N} = a_N + a_{N-1}b'_{N-1}b_N$$

For $2 \leqq 2N+1 < 11$ $$C_{2N+1} = a_N + a_{N+1}b'_{N+1}b_N$$

For the boundaries:

$C_0 = C_1 = 0$ $C_{11} = a_5$

The algorithm described above is useful in display of characters for all display monitors. The size of the character is not a parameter in the algorithm. As a result, the algorithm can be applied to any size characters. The algorithm can be expressed in a more general manner, however. Whenever characters are to be displayed in a finer resolution than the one in which they are stored, independent of the medium of the display, this algorithm can be applied to smooth out the appearance of those characters.

Figure 5:
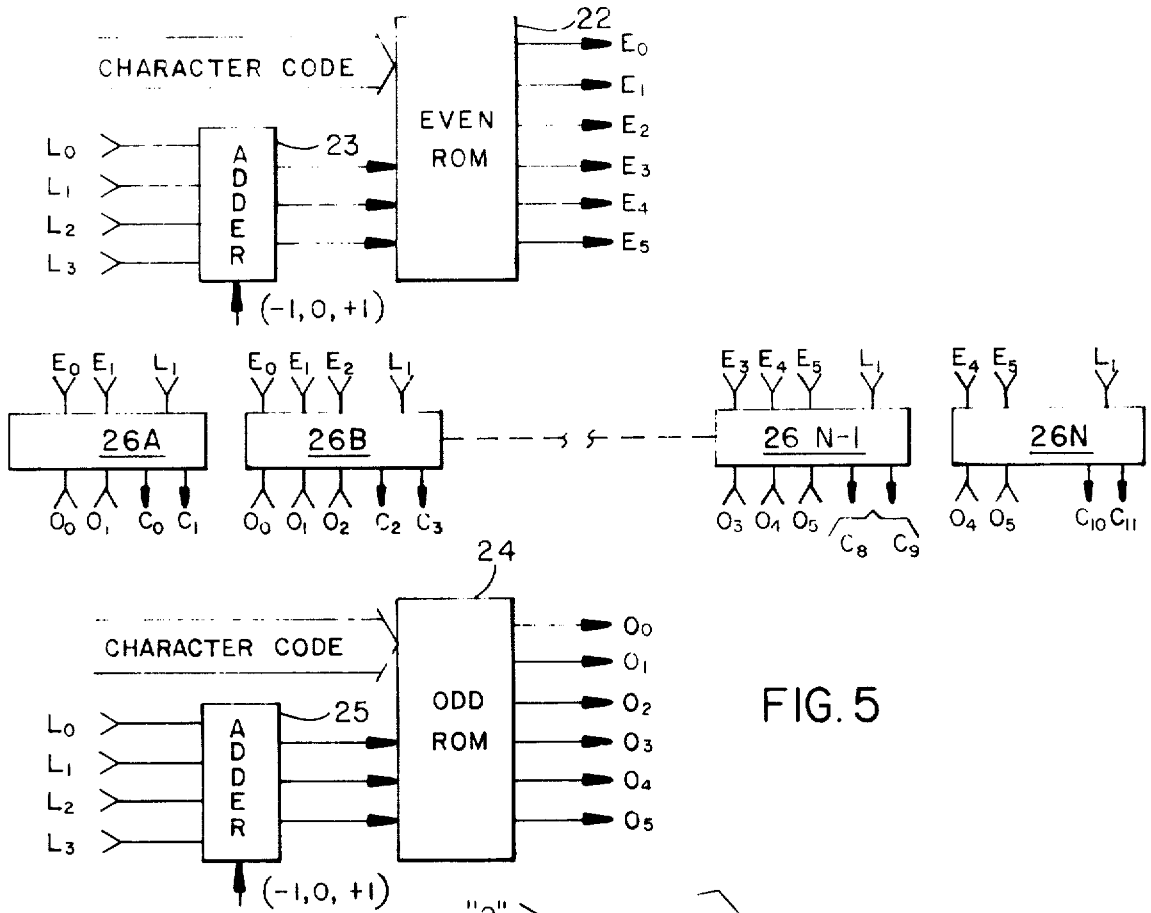
FIG. 5 is a detailed schematic of the character generator of FIG. 3.

Circuitry for the generation of this type of characters is illustrated in FIG. 5 (which is a more detailed diagram of the circuitry of FIG. 3) and includes even ROM 22 and odd ROM 24 the respective outputs of which are combined by combinatorial logic circuits 26A–N to generate the respective $C_i$ signals. The input signals to ROMs 22 and 24 are the character codes which specify what character is to be next displayed. Also supplied to each of the ROMs 22 and 24 is the line number which specifies the row of the character to be displayed. The character code can vary from character position to character position while the line address remains the same throughout a particular scan line.

The line address is represented by $(L_3 L_2 L_1 L_0)$ which is a binary number from 0 through 15. In this line address, $L_1$ determines where the primary information originates. For $L_1 = 0$, the primary information comes from even ROM 22 while, for $L_1 = 1$, the primary information comes from odd ROM 24. $L_0$ determines whether the secondary information comes from either the previous or next scan line. For $L_0 = 0$, the secondary information comes from the next line while, for $L_0 = 1$, the secondary information comes from the previous line.

The addresses into even ROM 22 and odd ROM 24 are $(L_3 L_2 L_1) + 1$, $(L_3 L_2 L_1) - 1$ or $(L_3 L_2 L_1)$. In FIG. 5, the addresses to the ROMs are created for the respective ROMs by adders 23 and 25. They will be more specifically described below.

Specific description of the significance of the respective L's will now be given for the even ROM. For $L_1 = 0$, the primary information comes from the even ROM so the line address into this ROM has to be $(L_3 L_2 L_1)$. For $L_1 = 1$, the secondary information comes from the even ROM. If $L_0 = 0$, the address is to be $(L_3 L_2 L_1) - 1$, for $L_0 = 1$ the address is to be $(L_3 L_2 L_1) + 1$.

Figure 6A:
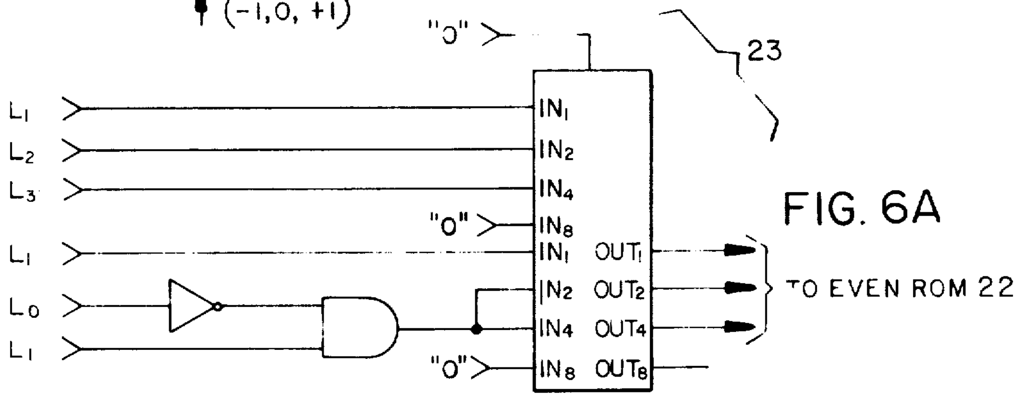
FIGS. 6A and B are diagrams of address generators as employed in the present invention.

Assume that the number to be added to the line number to obtain the address to even ROM 22 is expressed as $(X_{E3} X_{E2} X_{E1})$. Then, for $L_1 = 0$, $(X_{E3} X_{E2} X_{E1}) = (0\ 0\ 0)_2 = (0)_{10}$. For $L_1 = 1$ and $L_0 = 0$, then $(X_{E3} X_{E2} X_{E1}) = (1\ 1\ 1)_2 = (-1)_{10}$. For $L_1 = 1$ and $L_0 = 1$, then $(X_{E3} X_{E2} X_{E1}) = (0\ 0\ 1)_2 = (+1)_{10}$. The logic expressions for the respective X's are $X_{E1} = L_1$ and $X_{E2} = X_{E3} = L_1 L_0$. The address generator 23 of FIG. 5 to generate the line number for the even ROM is illustrated in detail in FIG. 6A.

Figure 6B:
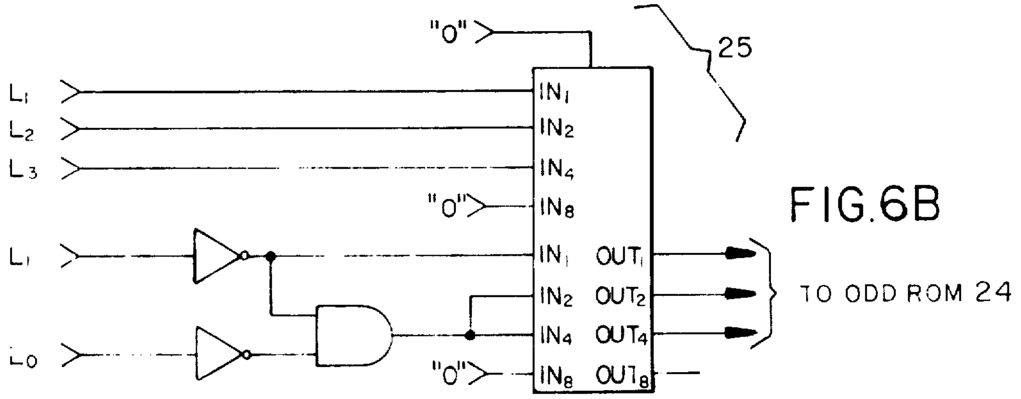

Address generator 25 for odd ROM 24 of FIG. 5 will now be described. This address generator is illustrated in detail in FIG. 6B. For $L_1 = 0$, the secondary information comes from the odd ROM. If $L_0 = 0$, the address should be $(L_3 L_2 L_1) - 1$ and if $L_0 = 1$, then the address should be $(L_3 L_2 L_1) + 1$. For $L_1 = 1$, the primary information comes from the odd ROM so the address should be $(L_3 L_2 L_1)$.

Again assume that the number to be added to the line number to get the address to odd ROM 24 of FIG. 5 is expressed as $(X_{03} X_{02} X_{01})$. Then, for $L_1 = 0$ and $L_0 =$ , $(X_{03} X_{02} X_{01}) = (1\ 1\ 1)_2 = (-1)_{10}$. For $L_1 = 0$ and $L_0 = 1$, $(X_{03} X_{02} X_{01}) = (0\ 0\ 1)_2 = (1)_{10}$. For $L_1 = 1$, $(X_{03} X_{02} X_{01}) = (0\ 0\ 0)_2 = (0)_{10}$. The logic expressions for the respective X's are $X_{01} = L_1'$ and $X_{02} = X_{03} = L_1' L_0'$.

The expressions for generating the output signals C are:

$$C_{2N} = a_N + a_{N-1} b'_{N-1} b_N$$

For $2 \leqq 2N+1 < 11$ $$C_{2N+1} = a_N + a_{N+1} b'_{N+1} b_N$$

And for the boundaries:

$C_0 = C_1 = 0$ $C_{11} = a_5$

In these expressions, $a_i$ is the primary information and $b_i$ is the secondary information. If the output of even ROM 22 of FIG. 5 is designated as $E_i$ ($i=0 \ldots N$) and the output of odd ROM 24 is designed as $O_i$, ($i=0 \ldots N$) then the expressions for $C_i$ are as follows:

$$C_{2N} = L_1 (0_N + 0_{N-1}E'_{N-1}E_N) = L_1(E_N + E_{N-1}0'_{N-1}0_N)$$

$$C_{2N-1} = L_1 (0_N + 0_{N+1}E'_{N+1}E_N) + L_1 (E_N + E_{N+1}0'_{N+1}0_N)$$

Simplified, these expressions become:

$$C_{2N} = 0_N L_1 + E_N L_1' + 0_N 0'_{N-1} + E_N E'_{N-1} 0_{N-1}$$

$$C_{2N+1} = 0_N L_1 + E_N L_1' + 0_N 0'_{N+1} E_{N+1} + E_N E'_{N+1} 0_{N+1}$$

Figure 7:
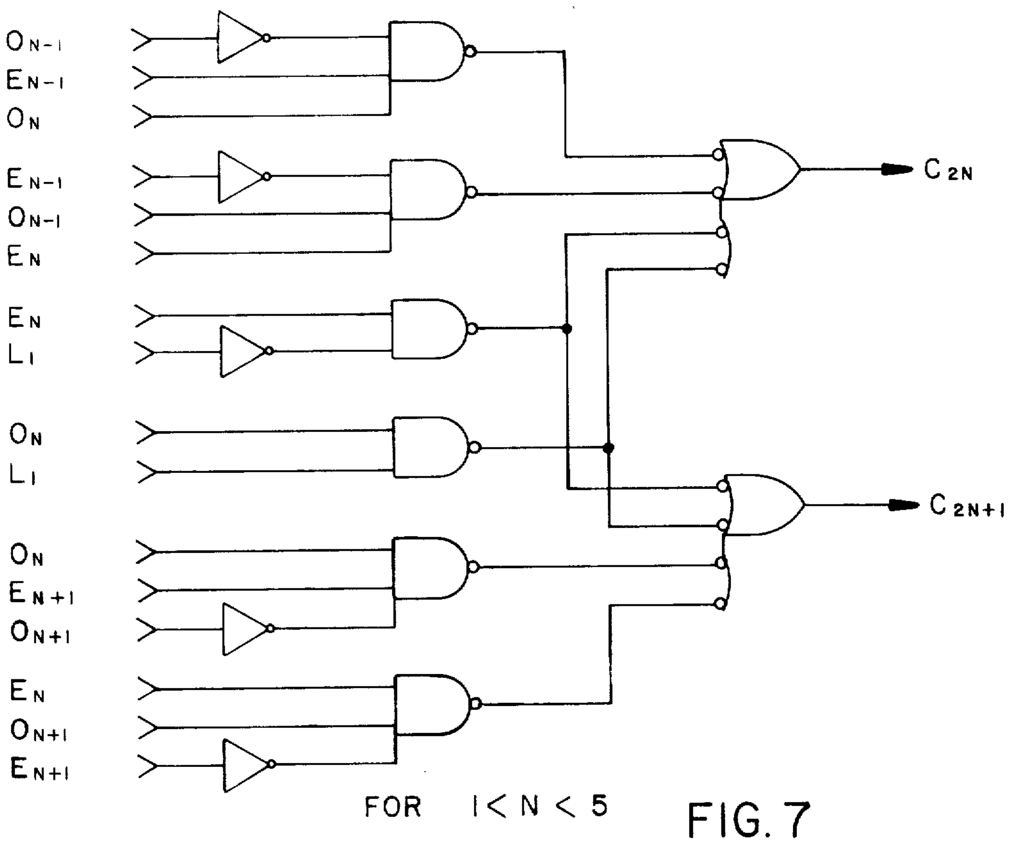
FIG. 7 is a schematic diagram of the combinatorial logic employed in the circuitry of FIG. 5.
Figure 8:
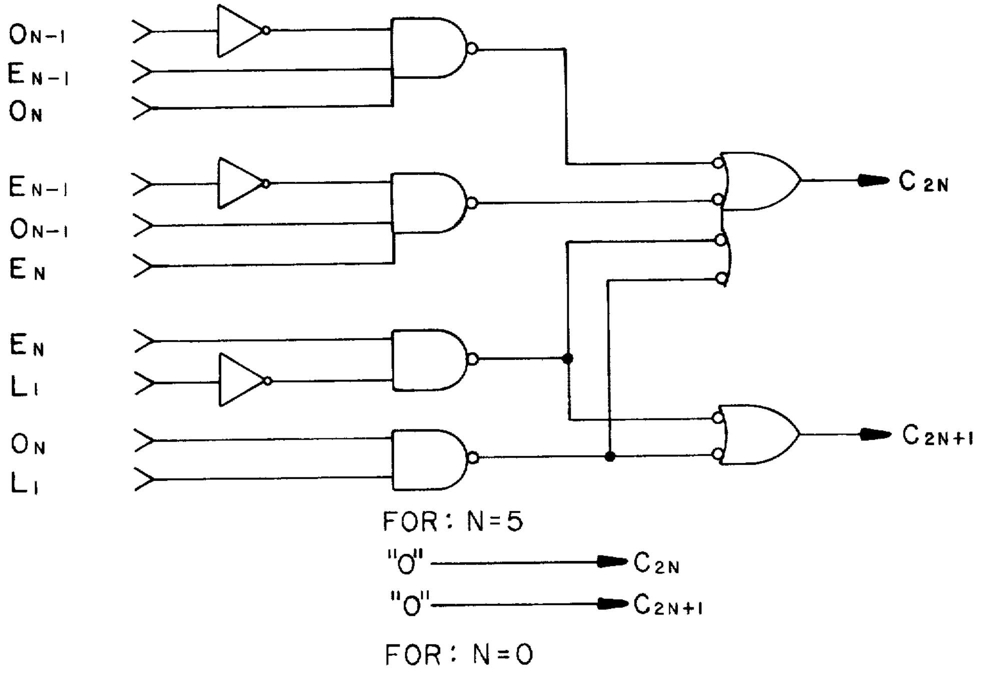
FIG. 8 is a schematic diagram of logic circuitry as also employed in the present invention for boundary conditions.

Circuitry for implementing these functions are illustrated in FIG. 7 for $1 < N < 5$. The implementation of the boundary conditions is illustrated in FIG. 8.

EPILOGUE

A display unit and the method employed thereby have been described above for the display of characters in dot matrix form where the signals which create the dot matrix are stored in a memory system. Circuitry is provided between the character generating circuitry and memory and the display screen to generate extra information bits whenever the information bits being displayed form a diagonal to thereby provide a smoother appearance to the displayed character. The invention is not limited to CRT displays and may be employed with any display using dot matrix characters such as matrix printers and the like.

The size of the character is not a parameter in the algorithm of the method employed. As a result, the algorithm can be applied to any size character. Whenever characters are to be displayed in a finer resolution than the one in which they are stored, independent of the medium of the display, the algorithm can be applied to smooth out the appearance of those characters.

While only one embodiment of the present invention has been disclosed, it will be apparent to those skilled in the art that variations and modifications may be made therein without departing from the spirit and the scope of the invention as claimed.

What is claimed is:

1. A system for displaying characters in a dot matrix form, said system comprising:
   - a display unit having a display face and means to scan said display face in an interlaced scan mode;
   - storage means to store information signals to representative of characters to be displayed, said storage means including a first store to hold information signals for even lines of the display and a second store to hold information signals for odd lines of display, which even and odd lines are to be displayed in said interlaced scan mode; and
   - logic means coupled to said display unit and to said storage means to receive information signals from both of said first store and second store at the same time and to generate extra bits signals for display during the particular scan being displayed whenever the information signals to be displayed form a diagonal.

2. A system according to claim 1 wherein the display unit includes a cathode ray tube display screen.

3. A system according to claim 1 wherein said display unit includes a matrix printer.

4. A system for display of characters in a dot matrix form, said system comprising:
   - a display unit having a display face and means to scan said display face in an interlaced scan mode;
   - storage means including a first storage to hold information signals for even lines of the display and a second store to hold information signals for odd lines of the display which signals represent characters to be displayed, said odd and even lines being displayed in said interlaced scan mode; and
   - logic means coupled to said display unit and to said first and second stores to generate extra bit signals for display whenver the information signals from said first and second stores form a diagonal line to be displayed.

5. A system according to claim 4 wherein:
   said logic means include circuitry to generate signals according to the Boolean expressions:

$$C_{2N} = a_N + a_{N-1} b'_{N-1} b_N$$

For $2 \leqq 2N+1 < 11$ $$C_{2N+1} = a_N + a_{N+1} b'_{N+1} b_N$$

For the boundaries:

$C_0 = C_1 = 0$ $C_{11} = a_5$ where the C's represent the output signals to be generated, the $a$'s represent the information signals from the first store and the $b$'s represent information signals from the second store.

6. In a system for the display of characters in a dot matrix form, said system including a display unit and storage means to store information signals representative of characters to be displayed, said storage means including a first store to store information signals for even lines of the display and a second store to store information signals for odd lines of the display, the method comprising:
   - retrieving information signals from said storage means;
   - generating extra bit signals for the display whenever the information signals to be displayed form a diagonal; and
   - displaying said even and odd lines in interlaced scans.

7. In a system for the display of characters in a dot matrix form, said system including a display unit and storage means having a first store to hold information signals for even lines of the display and a second store to hold information signals for odd lines of the display, the method comprising:
   - retrieving information signals from said first and second stores in sequence;
   - generating extra bit signals for display whenever the information signals from said first and second stores form a diagonal line to be displayed; and
   - displaying said even and odd lines in interlaced scans so that said information signals and said extra bit signals form a character.

8. A method according to claim 7 including:
   generating signals according to the Boolean expressions:

$$C_{2N} = a_N + a_{N-1}b'_{N-1}b_N$$

For $2 \leqq 2N+1 < 11$ $$C_{2N+1} = a_N + a_{N+1}b'_{N+1}b_N$$

For the boundaries:

$C_0 = C_1 = 0$ $C_{11} = a_5$ where the C's represent the output signals to be generated, the $a$'s represent the information signals from the first store and the $b$'s represent information signals from the second store.

* * * * *